UNITED STATES PATENT OFFICE.

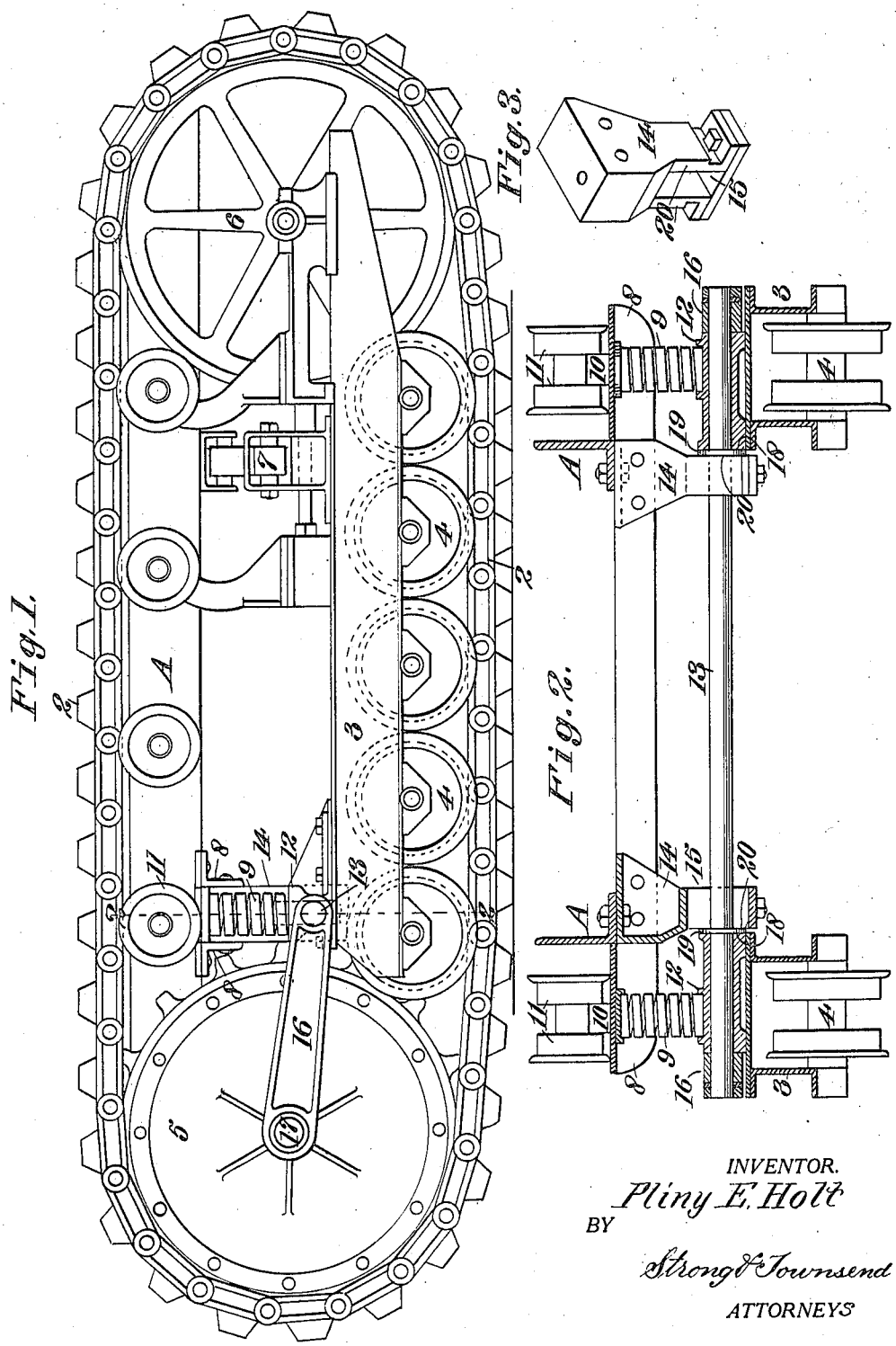

PLINY E. HOLT, OF STOCKTON, CALIFORNIA, ASSIGNOR TO THE HOLT MANUFACTURING COMPANY, OF STOCKTON, CALIFORNIA, A CORPORATION OF CALIFORNIA.

CHAIN-TRACK TRACTOR.

1,317,652.  Specification of Letters Patent.  Patented Sept. 30, 1919.

Application filed May 20, 1918. Serial No. 235,642.

*To all whom it may concern:*

Be it known that I, PLINY E. HOLT, a citizen of the United States, residing at Stockton, in the county of San Joaquin and State of California, have invented new and useful Improvements in Chain-Track Tractors, of which the following is a specification.

This invention relates to chain track tractors of the type illustrated in Patent No. 1,258,602, of March 5th, 1918; the special object of the invention being the development of a small, high-speed, military tractor.

Having reference to the accompanying drawings:

Figure 1 is a side elevation of a tractor embodying the invention.

Fig. 2 is a vertical, transverse section taken on line 2—2 of Fig. 1.

Fig. 3 is a perspective view of the vertical slides.

A represents the frame or chassis, supported by means hereinafter to be described on a pair of endless, flexible, self-laying track belts or chain track tractor members 2. Within each chain track is a truck 3, provided with truck rollers 4 adapted to run on the chain track and carry the load. The chain tracks are driven from the rear by sprockets 5 suitably journaled on the main frame; the tracks being guided at their front ends by idlers 6 adjustably mounted on the forward end of the trucks 3.

The front end of the main frame is supported yieldably upon an equalizer bar 7 which is centrally fulcrumed under the frame and shackled to the trucks.

The chief feature of novelty, represented by the present combination, resides in the means for resiliently supporting the rear end of the truck frame on the trucks and for steadying and guiding the trucks in parallelism and maintaining their proper relation to the drive sprockets, irrespective of the movements of the trucks and tracks with respect to the main frame.

As here shown, the main frame is provided with out-riggers 8 at each side which perform the double function of top chairs for the springs 9 and of a rest or shelf for the brackets 10, which latter carry the rollers 11 for supporting the rear portion of the top run of the chain tracks. The springs 9 are of the heavy compression type suitably seated in chairs 12 on the top of a truck adjacent to its rear extremity. The back ends of the trucks are maintained upright and parallel and are suitably guided by means of a cross shaft 13 which is loosely journaled at its ends on each truck and extends underneath the main frame but is disconnected therefrom; the shaft 13 operating at each side in vertical slides 14. The opening 15 in each slide is sufficient to allow for both the vertical movements of the shaft 13 in unison with the oscillations of the trucks, and also a certain amount of play fore and aft is allowed the shaft, due to the occasional buckling action or jackknifing of a truck with respect to its thrust bar 16, which latter has one end fulcruming on the end of shaft 13 and its other end on the drive shaft 17 of the sprocket 5.

By this jackknifing action or buckling downwardly of the parts 16 and 3 when an obstruction, like a stone, gets in between the sprocket teeth and the chain track, the parts are allowed to yield and carry the stone or other obstruction around without breakage to the chain or sprocket. For this reason there is a certain amount of play not only at the top and bottom of the shaft 13 and guides 14 but also at each side thereof.

Preferably the chairs 12, in which the springs 9 seat, are placed directly on top and form a part of the casting which constitutes a journal for the shaft 13. The trucks are guided in their up and down movement by the surfaced vertical walls 18, formed on the inner end of the casting 12, abutting against a friction plate or washer 19 which slides on the surfaced outer vertical walls 20 of the slides 14; the fit between the parts being sufficiently loose and the fit of the shaft 13 in its bearings 12 also being sufficiently loose to permit all of the parts to accommodate themselves to one another in the rise and fall of the trucks and movements of the machine in traveling over rough roads.

This construction is extremely simple, strong, durable, readily accessible and admirable not only for military but for general use.

The springs 9, disposed at each side of the machine, together with the third point of suspension provided by the equalizer bar 7, afford all necessary latitude of movement for the trucks and tracks without unduly imparting jerks, jars, twists, or strains to the main frame.

It is manifest that various changes may be made in the details of construction and in the form and proportions of the parts without in any wise departing from the spirit of the invention.

Having thus described my invention, what I claim and desire to secure by Letters Patent is—

1. In a tractor, the combination of a main frame, a pair of endless chain tracks at each side thereof, a truck within each track, means yieldingly supporting the frame on the forward ends of the trucks, springs between the truck frame and the rear ends of the trucks, and a cross shaft connecting the rear ends of the trucks and extending beneath the main frame, said shaft being vertically guided and sliding on the main frame.

2. In a tractor, the combination of a main frame, a pair of endless chain tracks at each side thereof, a truck within each track, means yieldingly supporting the frame on the forward ends of the trucks, springs between the truck frame and the rear ends of the trucks, a cross shaft connecting the rear ends of the trucks and extending beneath the main frame, said shaft being vertically guided and sliding on the main frame, and a thrust link disposed downwardly and inwardly and connected to the main frame and to the rear end of the truck.

3. In a tractor, the combination of a main frame, a pair of endless chain tracks at each side thereof, a truck within each track, means yieldingly supporting the frame on the forward ends of the trucks, springs between the truck frame and the rear ends of the trucks, and a cross shaft connecting he rear ends of the trucks and extending beneath the main frame, said shaft being vertically guided and sliding on the main frame, said slides also forming friction surfaces for vertically guiding the trucks in their movements with respect to the main frame.

4. In a traction engine, the combination of a main frame, a pair of endless chain tracks upon which the frame is supported, drive sprockets journaled on the main frame, trucks within the chain tracks, said trucks each carrying an idler at its forward end, a chain track passing around a respective sprocket and idler, means for yieldingly supporting the front end of the main frame on the trucks, and means for yieldingly supporting the rear end of the main frame on the trucks, said means including a cross shaft pivoted to the trucks and freely slidable in vertical guides on the main frame, with springs provided between the trucks and the main frame.

5. In a traction engine, the combination of a main frame, a pair of endless chain tracks upon which the frame is supported, drive sprockets journaled on the main frame, trucks within the chain tracks, said trucks each carrying an idler at its forward end, a chain track passing around a respective sprocket and idler, means for yieldingly supporting the front end of the main frame on the trucks, means for yieldingly supporting the rear end of the main frame on the trucks, said means including a cross shaft pivoted to the trucks and freely slidable in vertical guides on the main frame, with springs provided between the trucks and the main frame, and a forwardly inclined thrust link between each truck and the main frame for maintaining the trucks out of interference with their sprockets, said shaft which connects the trucks having a limited bodily fore and aft movement in the slides to accommodate the shaft to the articulations of the trucks and thrust links.

6. In a traction engine, the combination of a main frame, a pair of endless chain tracks upon which the frame is supported, drive sprockets journaled on the main frame, trucks within the chain tracks, said trucks each carrying an idler at its forward end, a chain track passing around a respective sprocket and idler, means for yieldingly supporting the front end of the main frame on the trucks, and means for yieldingly supporting the rear end of the main frame on the trucks, said means including a cross shaft pivoted to the trucks and freely slidable in vertical guides on the main frame, with springs provided between the trucks and the main frame, the outer vertical faces of the slides forming guides for the adjacent vertical faces of the trucks.

7. In a traction engine, the combination of a main frame, a pair of endless chain tracks upon which the frame is supported, drive sprockets journaled on the main frame, trucks within the chain tracks, said trucks each carrying an idler at its forward end, a chain track passing around a respective sprocket and idler, means for yieldingly supporting the front end of the main frame on the trucks, means for yieldingly supporting the rear end of the main frame on the trucks, said means including outriggers formed on the main frame, springs seating against the underside of said outriggers and resting on the trucks, a cross bar pivotally connecting the trucks across and beneath the main frame, said cross shaft having a free vertical motion with respect to the main frame, and guide rollers mounted on said outriggers for supporting the upper run of the track belt.

8. A chain track vehicle comprising a main frame, a pair of endless chain tracks at each side of the main frame, roller bearing trucks within the tracks, sprockets journaled on the main frame in line with the trucks, front idlers mounted on the trucks, around which idlers, trucks and sprockets of the respective tracks are adapted to travel, means for equally distributing the weight of the front end of the main frame upon the two trucks, spring connectors between the rear end of the frame and the trucks for yieldingly supporting the load on the trucks, said trucks journaled at their rear ends on a shaft which extends beneath the main frame and forming a common pivot for the trucks detached from the main frame, and thrust links between the main frame and trucks.

In testimony whereof I have hereunto set my hand in the presence of two subscribing witnesses.

PLINY E. HOLT.

Witnesses:
   JOHN H. HERRING,
   W. W. HEALEY.